(12) United States Patent
Kudoh (10) Patent No.: US 8,325,428 B2
(45) Date of Patent: Dec. 4, 2012

(54) LENS BARREL AND IMAGE PICKUP APPARATUS

(75) Inventor: Tomoyuki Kudoh, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/044,011

(22) Filed: Mar. 9, 2011

(65) Prior Publication Data

US 2011/0235190 A1    Sep. 29, 2011

(30) Foreign Application Priority Data

Mar. 24, 2010   (JP) ................................ 2010-068619

(51) Int. Cl.
*G02B 15/14* (2006.01)
(52) U.S. Cl. .......................................... 359/704; 396/72
(58) Field of Classification Search .................. 359/704; 396/72

See application file for complete search history.

(56) References Cited

U.S. PATENT DOCUMENTS

| 6,835,006 B2 | 12/2004 | Tanaka et al. |
| 7,391,965 B2 * | 6/2008 | Noguchi ..................... 396/72 |
| 2003/0219243 A1 | 11/2003 | Tanaka et al. |

FOREIGN PATENT DOCUMENTS

| CN | 100335936 A | 9/2005 |
| JP | 2004-347615 | 12/2004 |

* cited by examiner

*Primary Examiner* — James Jones
(74) *Attorney, Agent, or Firm* — Cowan, Liebowitz & Latman, PC

(57) ABSTRACT

A lens barrel which is capable of reducing, when the lens barrel is in a stored position, the thickness of an image pickup apparatus in its optical axis direction and also the diameter of the lens barrel. The lens barrel has a first lens, a second lens, a lens holding unit adapted to hold the second lens, and an iris diaphragm. The lens barrel moves between a photographing position and a stored position in the optical axis direction. The second lens includes a convex spherical portion protruding toward the first lens. The second lens is arranged close to the first lens and an inner circumferential portion of the diaphragm blades is arranged inwardly in the radial direction with respect to the lens holding unit and oppositely to the convex spherical portion in the radial direction, when the lens barrel is in the stored position.

4 Claims, 9 Drawing Sheets

LENS BARREL AND IMAGE PICKUP APPARATUS

BACKGROUND OF THE INVENTION

1. Field of the Invention

The present invention relates to a lens barrel having an iris diaphragm that adjusts an amount of incident light and an image pickup apparatus such a film camera or a digital camera having the lens barrel built-in.

2. Description of the Related Art

A digital camera in which a lens barrel having an iris diaphragm is mounted increases in thickness with respect to its optical axis direction by the thickness of the iris diaphragm when the lens barrel is stored.

Thus, there is conventionally discussed a technique of reducing the thickness of a camera in its optical axis direction by arranging the diaphragm on the object side of a lens unit and inserting the lens unit into an opening of shutter blades or diaphragm blades when the lens barrel is stored (see Japanese Laid-Open Patent Publication (Kokai) No. 2004-347615, for example).

In the technique of Japanese Laid-Open Patent Publication (Kokai) No. 2004-347615, a lens unit and a lens holding frame that holds the lens unit are inserted into the opening of the diaphragm blades in the optical axis direction, which requires the whole diaphragm blades to be retracted outwardly in a radial direction of the lens unit and the lens holding frame when the lens barrel is stored.

This increases the area of the diaphragm blades to increase an outer diameter of the whole diaphragm, which increases the diameter of the lens barrel. Consequently, the thickness of the camera reduces in its optical axis direction, which, however, increases the height and width dimensions, thereby leading to an increasing size of a camera.

SUMMARY OF THE INVENTION

The present invention provides a lens barrel which is capable of reducing, when the lens barrel is in a stored position, the thickness of an image pickup apparatus in its optical axis direction and also the diameter of the lens barrel, and an image pickup apparatus having the lens barrel built-in.

According to an aspect of the present invention, there is provided a lens barrel having a first lens, a second lens, a lens holding unit adapted to hold the second lens in such a manner that the second lens moves relatively closer to or apart from the first lens in an optical axis direction of the lens barrel, and an iris diaphragm arranged between the first lens and the second lens and having diaphragm blades to adjust an amount of incident light, the lens barrel moving between a photographing position and a stored position in the optical axis direction to change the photographing magnification, wherein the second lens includes a convex spherical portion, protruding toward the first lens, at an end face thereof facing the first lens in the optical axis direction, and the second lens is arranged close to the first lens and an inner circumferential portion of the diaphragm blades is arranged inwardly in the radial direction with respect to the second lens holding unit in the radial direction and oppositely to the convex spherical portion in the radial direction, when the lens barrel is in the stored position.

According to the present invention, it is possible to reduce, when the lens barrel is in the stored position, the thickness of the image pickup apparatus in its optical axis direction and also the diameter of the lens barrel.

Further features and advantages of the present invention will become apparent from the following detailed description of exemplary embodiments with reference to attached drawings.

DESCRIPTION OF THE EMBODIMENT

The present invention will now be described in detail with reference to the drawings.

Figure 1:
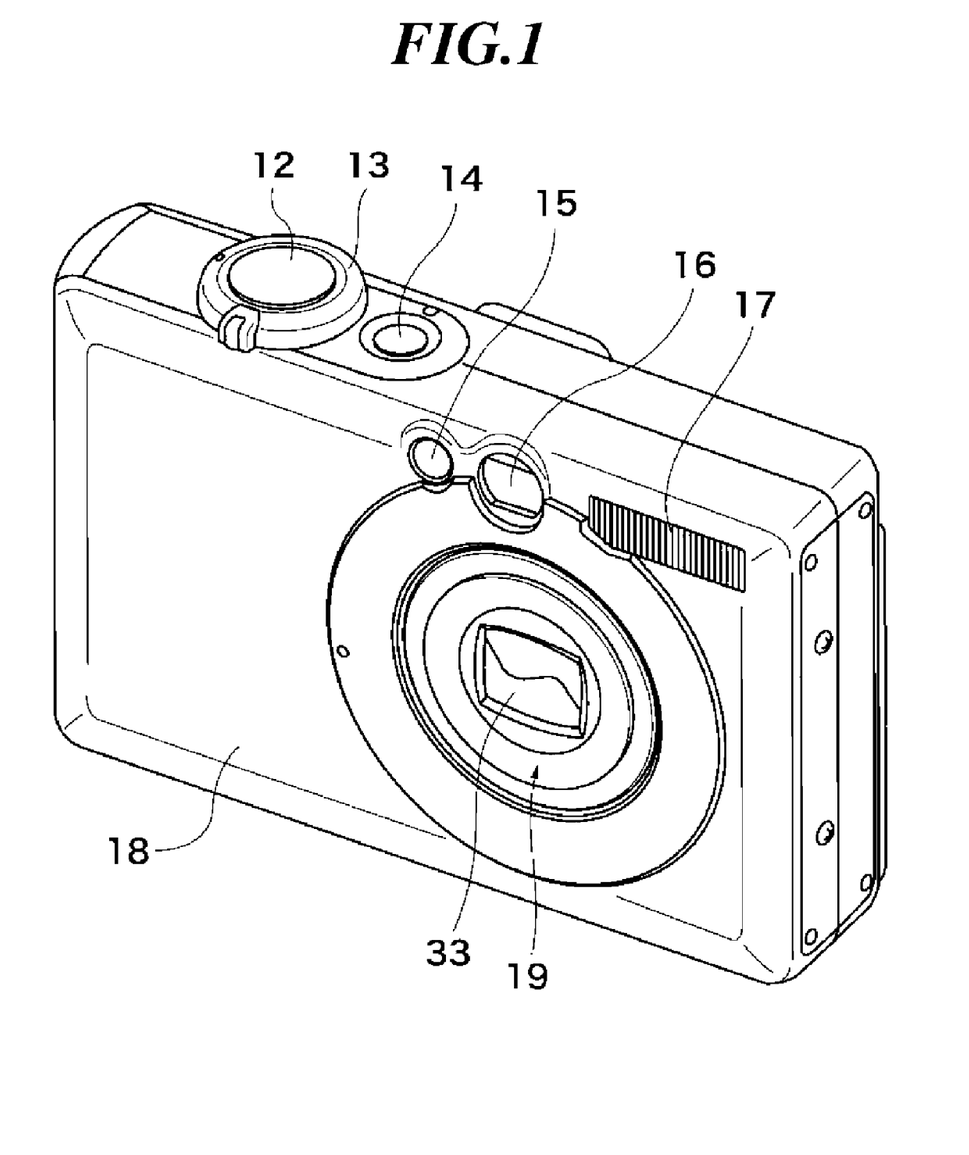
FIG. 1 is an external perspective view of a digital camera as an image pickup apparatus having a lens barrel according to an embodiment of the present invention when viewed from its front side, with a lens barrel in a stored position.
Figure 2:
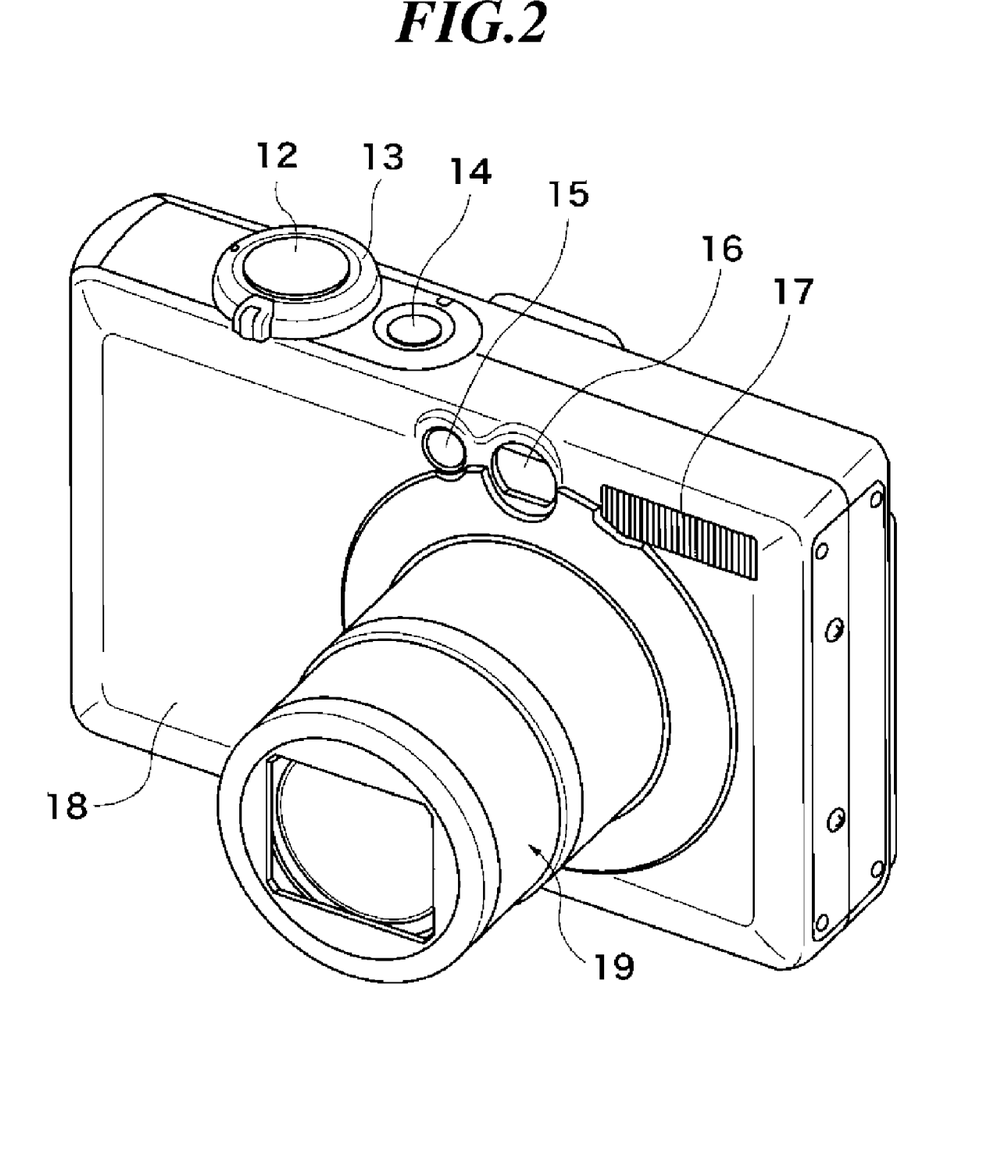
FIG. 2 is an external perspective view of the digital camera of FIG. 1 with the lens barrel in a photographing position.
Figure 3:
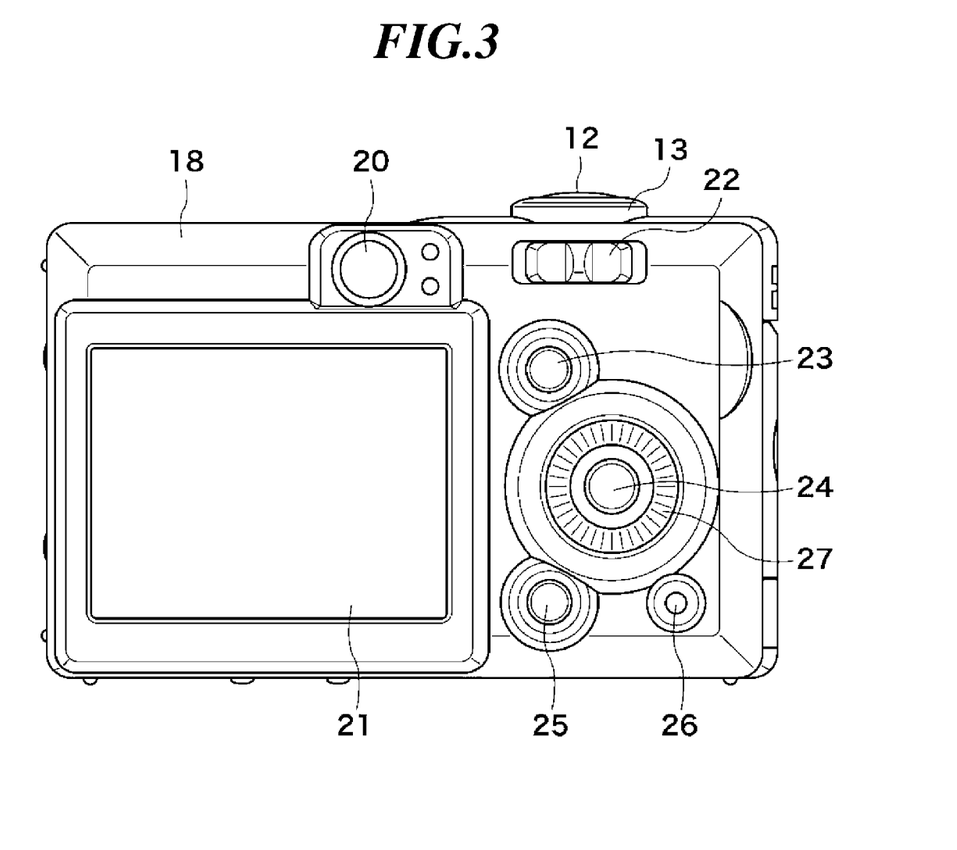
FIG. 3 is a rear view of the digital camera of FIG. 1.
Figure 4:
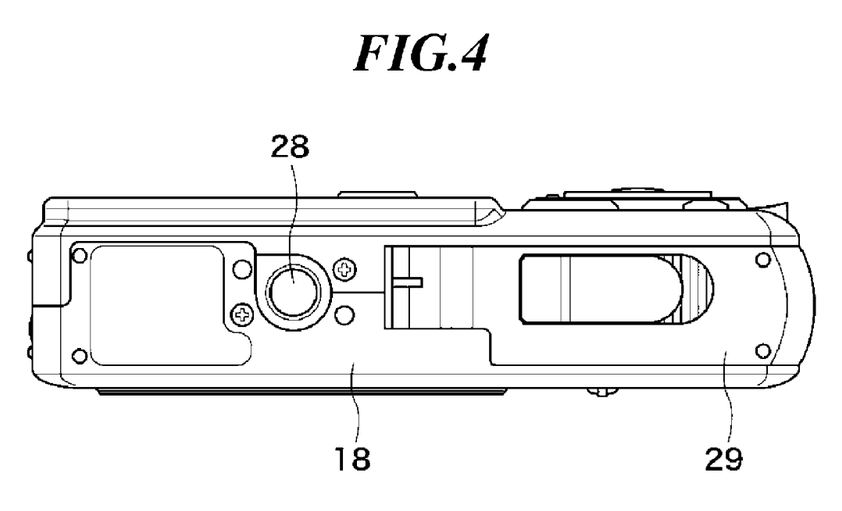
FIG. 4 is a bottom view of the digital camera of FIG. 1.

FIG. 1 is an external perspective view of a digital camera as an image pickup apparatus having a lens barrel according to an embodiment of the present invention when viewed from its front side, with a lens barrel in a stored position; FIG. 2 is an external perspective view of the digital camera of FIG. 1 with the lens barrel in a photographing position; FIG. 3 is a rear view of the digital camera of FIG. 1; and FIG. 4 is a bottom view of the digital camera of FIG. 1.

As shown in FIGS. 1 and 2, the digital camera 18 has, arranged on its front side, a finder 16 that determines the composition of an object, an auxiliary light source 15 used for photometry/ranging, a strobe 17, and a lens barrel 19. On the top side of the digital camera 18 are arranged a release button 12, a power supply switching button 14, and a zoom switch 13.

Also as shown in FIG. 3, the digital camera 18 has, arranged on its rear side, operation buttons 22 to 27, a display 21 such as an LCD, and a finder eyepiece 20. Further, on the bottom side of the digital camera 18 are arranged, as shown in FIG. 4, a tripod mounting portion 28, a memory card drive 42 (see FIG. 5), and a cover 29 of a battery insertion portion (not shown).

Figure 5:
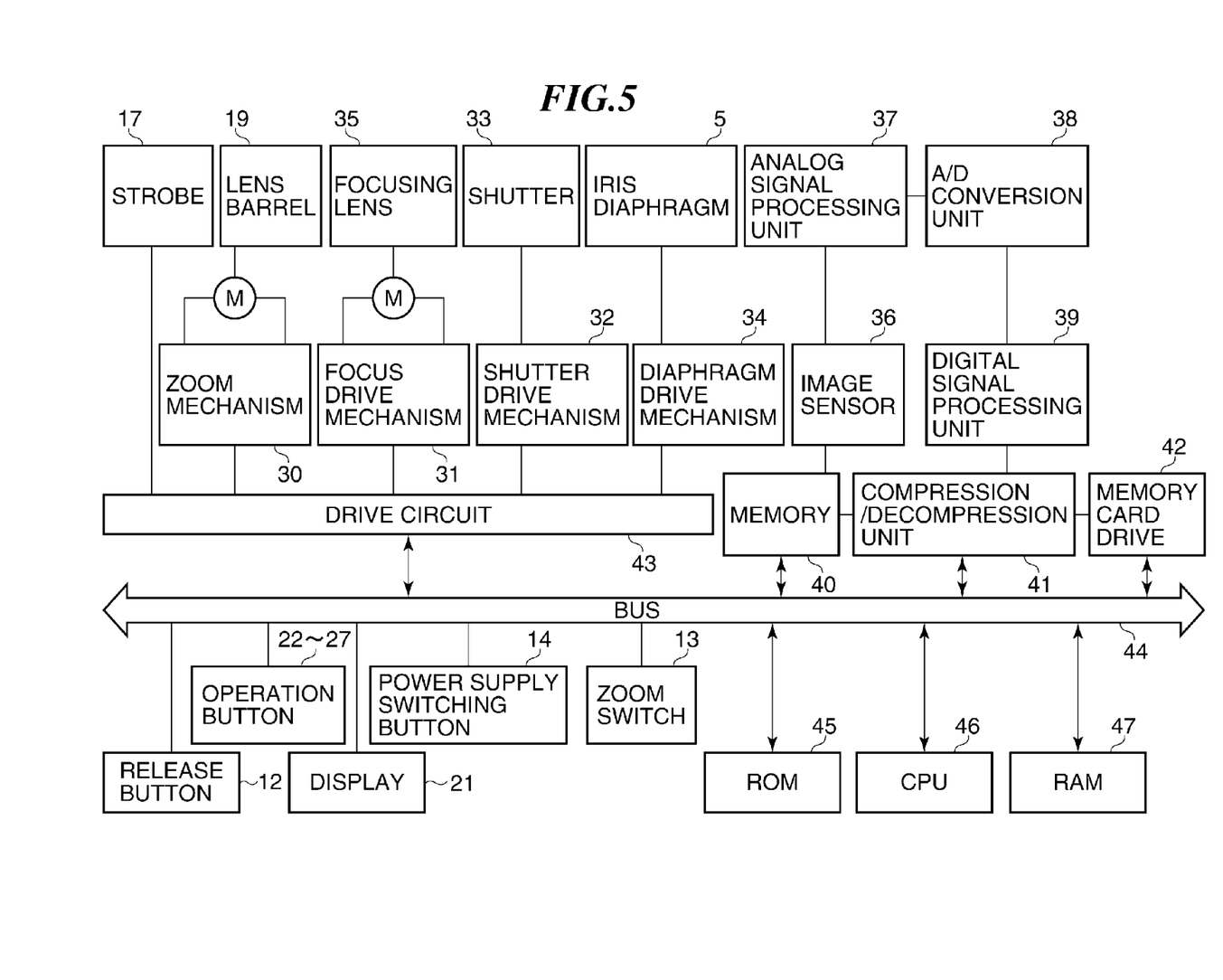
FIG. 5 is a block diagram of an internal configuration of the digital camera of FIG. 1.

FIG. 5 is a block diagram of an internal configuration of the digital camera 18 of FIG. 1.

To a bus 44 are connected a CPU 46, a ROM 45, a RAM 47, the release button 12, the operation buttons 22 to 27, the display 21, the power supply switching button 14, the zoom switch 13, a memory 40, a compression/decompression unit 41, a memory card drive 42, and a drive circuit 43.

To the drive circuit 43 are connected to a zoom mechanism 30 that zoom-drives the lens barrel 19 to move in the optical axis direction between a photographing position and a stored position to thereby change the photographing magnification, a focus drive mechanism 31 that drives a focusing lens 35, a shutter drive mechanism 32 that drives a shutter 33 (see FIG. 1), and a diaphragm drive mechanism 34 that drives an iris diaphragm 5.

To the drive circuit 43 are also connected an image sensor 36 such as a CCD sensor, a CMOS sensor, and the strobe 17. Driving of each unit connected to the drive circuit 43 is controlled based on a signal from the CPU 46 via the drive circuit 43.

The ROM 45 stores various control programs and the RAM 47 stores data necessary for various control programs. An analog signal processing unit 37 performs analog processing on image data output from the image sensor 36 and outputs the processed image data to an A/D conversion unit 38.

The A/D conversion unit 38 converts analog data fetched from the image sensor 36 into digital data and outputs the digital data to a digital signal processing unit 39. The digital signal processing unit 39 performs predetermined processing on the digital data converted by the A/D conversion unit 38 and outputs the processed data to the memory 40 as image data.

Operation of the operation button 23 causes the compression/decompression unit 41 to perform compression processing of JPEG or TIFF on the image data stored in the memory 40, and then to output the compressed image data to a memory card inserted in the memory card drive 42 for storage.

The compression/decompression unit 41 performs decompression processing on the image data stored in the memory 40 or the image data stored in the memory card, and then enables the display 21 to display the image data via the bus 44. If a user determines an image displayed in the display 21 is unnecessary while viewing the image, the user can delete the image through the operation of the operation button 24.

Figure 6:
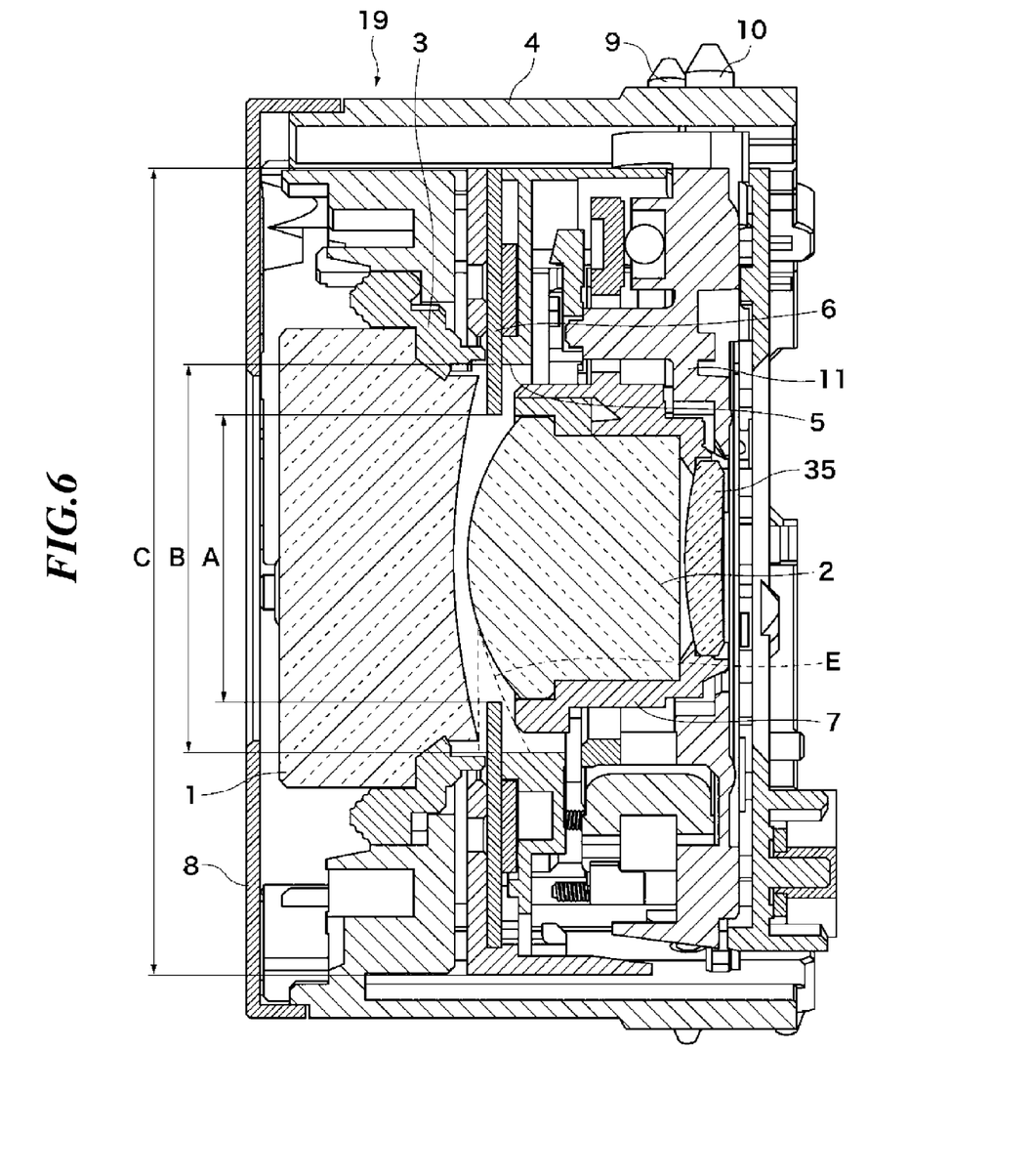
FIG. 6 is a sectional view of a principal part of a lens barrel in FIG. 1 with the lens barrel in the stored position.

Next, descriptions will be made of the lens barrel 19 having the iris diaphragm 5 with reference to FIGS. 6 and 7. FIG. 6 is a sectional view of a principal part of a lens barrel in FIG. 1 with the lens barrel in the stored position; and FIG. 7 is a sectional view of a principal part of the lens barrel with the lens barrel in FIG. 1 in the photographing position.

Figure 7:
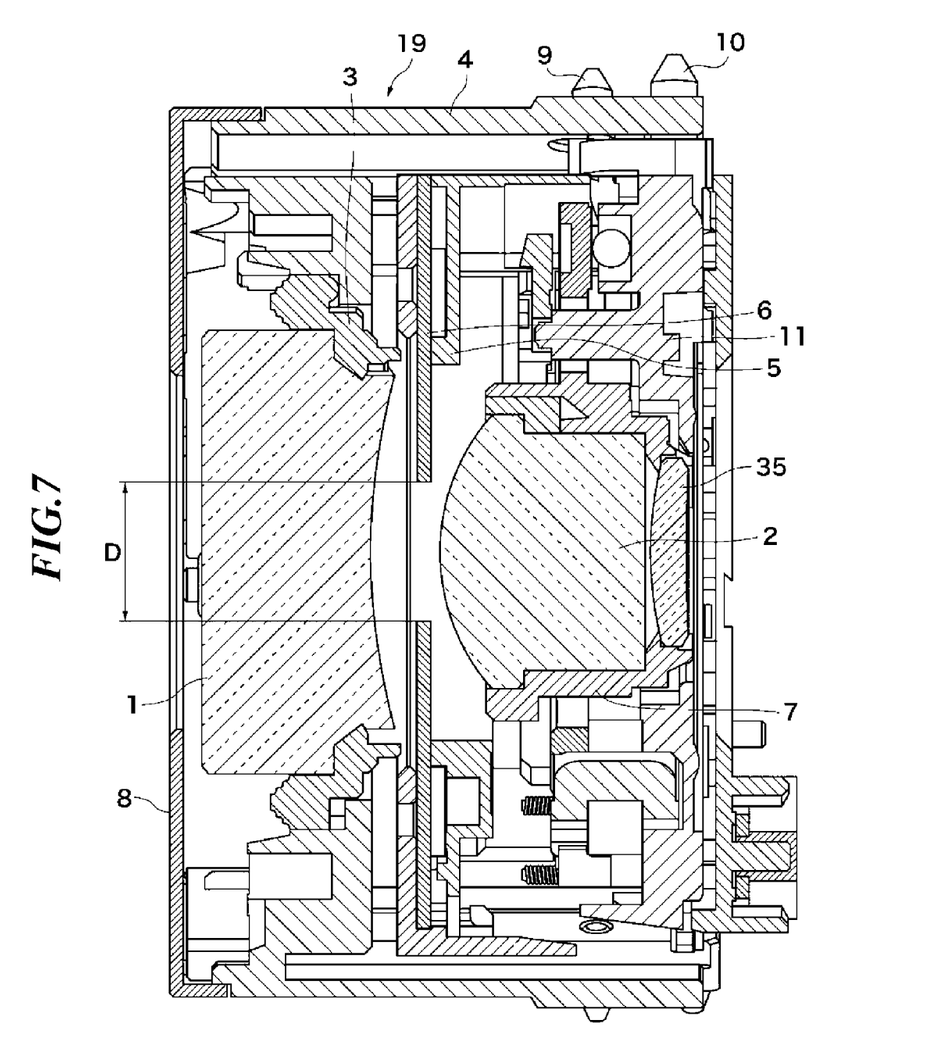
FIG. 7 is a sectional view of a principal part of the lens barrel with the lens barrel in FIG. 1 in the photographing position.

As shown in FIGS. 6 and 7, the lens barrel 19 has a first lens 1, a first lens holding frame 3, and a barrel 4. The first lens 1 is held by the first lens holding frame 3 which is fixed to the barrel 4. The barrel 4 is fitted with a lens cover 8 at an object side end thereof. The lens cover 8 has an opening at a center portion thereof.

Arranged on an image face side of the first lens 1 is a second lens 2 that is held by a second lens holding frame 7 in such a manner that the second lens 2 can move relatively closer to or apart from the first lens 1 in the optical axis direction. The second lens 2 has a convex spherical shape, protruding toward the first lens 1, at an end face thereof facing the first lens 1 in the optical axis direction.

The second lens holding frame 7 is held by a second lens base frame 11. Arranged between the first lens 1 and the second lens 2 in the optical axis direction is an iris diaphragm 5 having diaphragm blades 6 that adjusts an amount of incident light. The first lens holding frame 3 corresponds to an example of a first lens holding unit according to the present invention and the second lens holding frame 7 corresponds to an example of a second lens holding unit according to the present invention.

The iris diaphragm 5 is provided with a follower 9 and the second lens base frame 11 is provided with a follower 10. Rotation of a cam barrel (not shown) causes the follower 9 and the follower 10 to follow a cam groove of the cam barrel to thereby move the iris diaphragm 5 and the second lens 2 in the optical axis direction between when the lens barrel 19 is in the stored position as shown in FIG. 6 and when the lens barrel 19 is in the photographing position as shown in FIG. 7.

The distance between the iris diaphragm 5 and the second lens 2 in the optical axis direction is greater in the photographing position shown by FIG. 7 than in the stored position shown by FIG. 6 so that an inner circumferential portion of the diaphragm blades 6 can move in its radial direction to open/close the iris diaphragm 5, which changes in size of the opening of the inner circumferential portion of the diaphragm blades 6 between a small aperture and a large full aperture.

In the stored position shown by FIG. 6, the first lens 1 and the second lens 2 are closest to each other, thereby reducing the length of the lens barrel 19 in the optical axis direction and decreasing the thickness of the digital camera 18 in the optical axis direction. The diaphragm blades 6 of the iris diaphragm 5 are arranged closer to the first lens 1 when the lens barrel 19 is in the stored position as shown in FIG. 6 than when the lens barrel 19 is in the photographing position as shown in FIG. 7.

Conventionally, regardless of the shape of the second lens 2, the second lens 2 and the second lens holding frame 7 have been inserted into the opening of the inner circumferential portion of the diaphragm blades 6 when the lens barrel 19 is in the stored position, thereby requiring the diaphragm blades 6 to be opened upto a diameter B, which is greater than an outside diameter of the second lens holding frame 7 which requires the diaphragm blades 6 to be stored in a space formed between the diameter B and an outside diameter (C) of the iris diaphragm 5 to unfavorably increase the outside diameter (C) of the iris diaphragm 5 with the diameter of the lens barrel 19 greater.

Thus, in the present embodiment, a part of the inner circumferential portion of the diaphragm blades 6 is not stored in the space formed between the diameter (B) and the outside diameter (C) of the iris diaphragm 5 when the lens barrel 19 is in the stored position.

More specifically, as shown in FIG. 6, the inner circumferential portion of the diaphragm blades 6 is arranged inwardly in the radial direction with respect to the second lens holding frame 7 and oppositely to a convex spherical portion of the second lens 2 in the radial direction when the lens barrel 19 is in the stored position.

In the present embodiment, the inner circumferential portion of the diaphragm blades 6 is arranged within an annular space E with a substantially triangular half-section surrounded by an image surface side end face of the first lens 1 and a plane contacting both the convex spherical portion of the second lens 2 and an outer circumferential portion of an object side end face of the second lens holding frame 7 with the inner circumferential portion of the diaphragm blades 6 protruding inwardly in the radial direction. In this case, a diameter A of the inner circumferential portion of the diaphragm blades 6 at this point is smaller than the diameter B, which reduces the outside diameter (C) of the iris diaphragm 5 to thereby reduce the diameter of the lens barrel 19.

Figure 8:
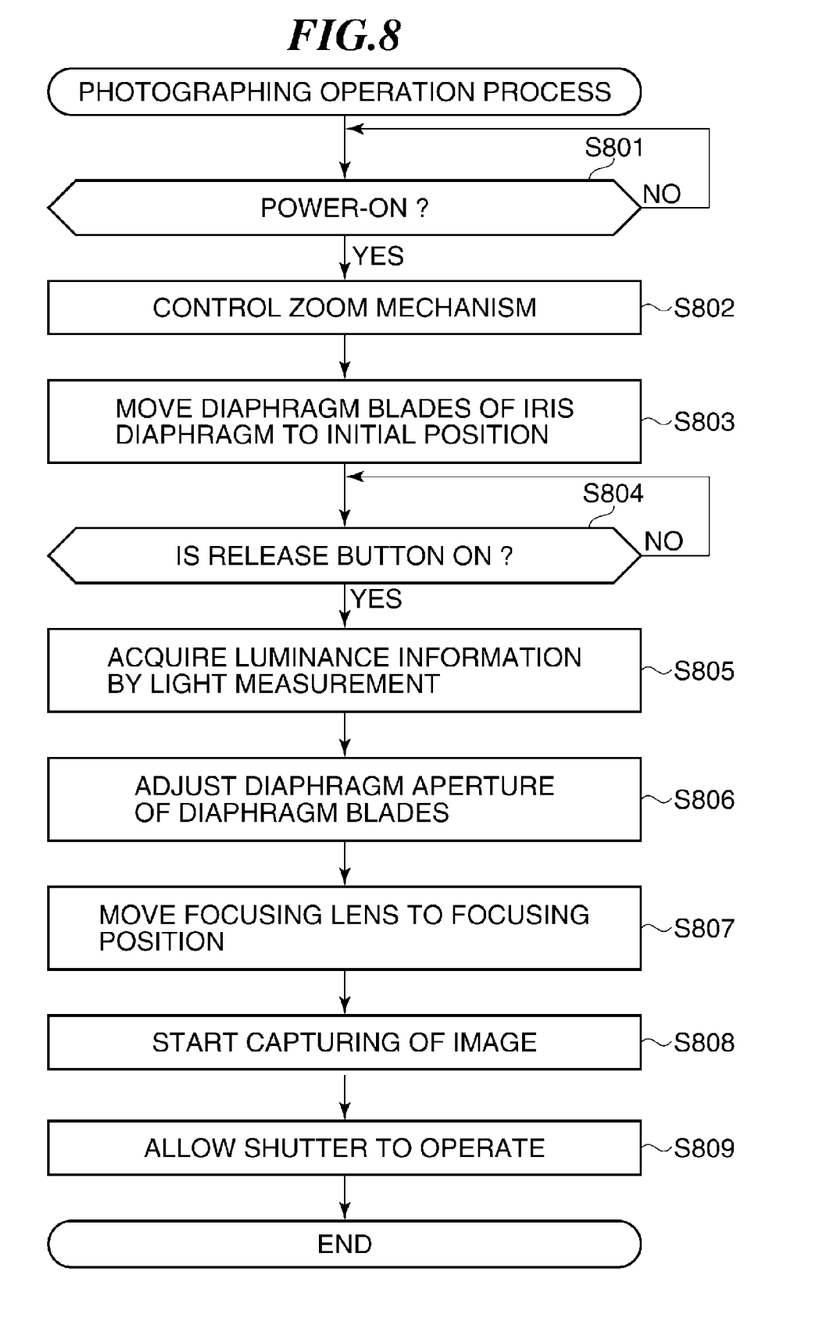
FIG. 8 is a flowchart showing the procedure of a photographing operation process that is performed by the digital camera of FIG. 1.

FIG. 8 is a flowchart showing the procedure of a photographing operation process that is performed by the digital camera of FIG. 1.

Each piece of processing in FIG. 8 is performed by the CPU 46 with a program in the ROM 45 being loaded into the RAM 47.

In FIG. 8, when the power supply switching button 14 is first turned on by the user (YES to step S801). Controlling the zoom mechanism 30 via the drive circuit 43 allows the lens barrel 19 to move to the photographing position (FIG. 7) (step S802).

Subsequently, controlling the diaphragm drive mechanism 34 via the drive circuit 43 allows the diaphragm blades 6 of the iris diaphragm 5 to move to an initial position (for example, a diameter D in FIG. 7)(step S803). With reference to FIGS. 6 and 7, both of the distance between the iris diaphragm 5 and the second lens 2 in the optical axis direction and the distance between the first lens 1 and the second lens 2 in the optical axis direction are greater when the lens barrel 19 is in the photographing position as shown in FIG. 7 than when the lens barrel 19 is in the stored position as shown in FIG. 6.

Next, the release button 12 is turned on by the user (YES to step S804), luminance information of an object is acquired through the photometry (step S805).

In the following step S806, controlling the diaphragm drive mechanism 34 via the drive circuit 43 allows the diaphragm blades 6 of the iris diaphragm 5 to adjust the diaphragm aperture to an appropriate position, based on the luminance information acquired in the step S805.

Further, controlling the focus drive mechanism 31 via the drive circuit 43 allows the focusing lens 35 to move to a focusing position of the object (step S807), and then the image sensor 36 is driven via the drive circuit 43 to start capturing of an image.

In the following step S809, controlling the shutter drive mechanism 32 via the drive circuit 43 allows the shutter 33 to be operated, thereby causing the image sensor to terminate capturing of the image, followed by the program terminating.

Figure 9:
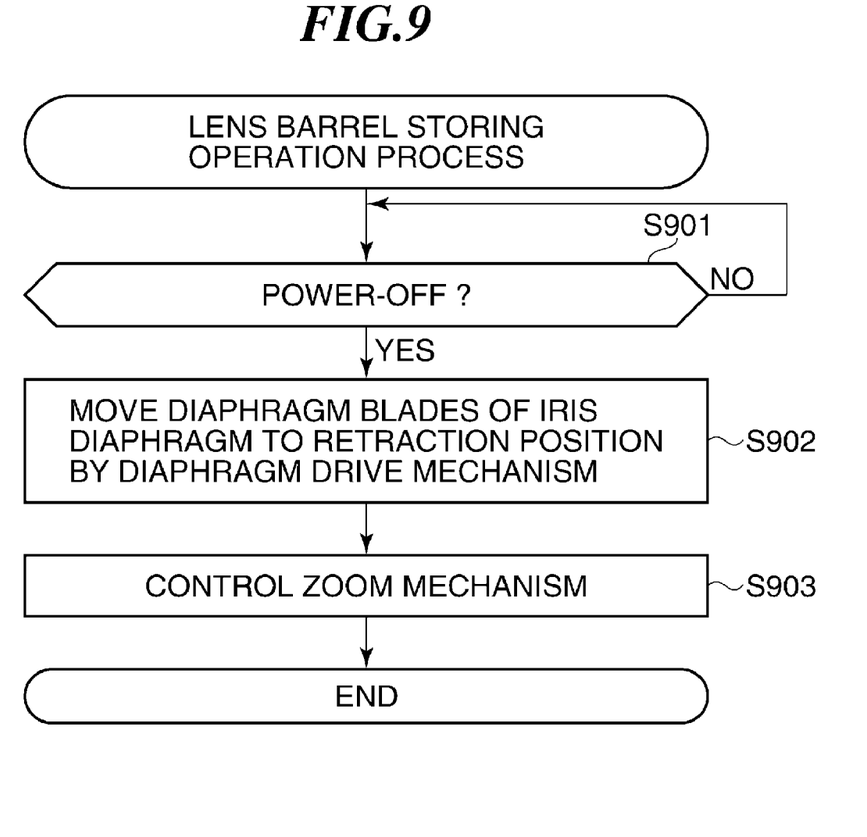
FIG. 9 is a flowchart showing the procedure of a storing operation process of the lens barrel that is performed by the digital camera of FIG. 1.

FIG. 9 is a flowchart showing the procedure of a storing operation process of the lens barrel that is performed by the digital camera of FIG. 1.

Each piece of processing in FIG. 9 is performed by the CPU 46 with a program in the ROM 45 being loaded into the RAM 47.

In FIG. 9, when the power supply switching button 14 is first turned off by the user (YES to step S901), controlling the diaphragm drive mechanism 34 via the drive circuit 43 allows the diaphragm blades 6 of the iris diaphragm 5 to move to a retraction position (for example, a diameter A in FIG. 6) (step S902).

Subsequently, controlling the zoom mechanism 30 via the drive circuit 43 allows the lens barrel 19 to move to the stored position (FIG. 6) to thereby be located at the stored position (step S903), followed by the program terminating. In this state, the first lens 1 and the second lens 2 are in a state closest to each other, and hence the inner circumferential portion of the diaphragm blades 6 is located inwardly in the radial direction with respect to the second lens holding frame 7 and oppositely in the radial direction with respect to the convex spherical portion of the second lens 2.

As described above, according to the present embodiment, the first lens 1 and the second lens 2 are in a state closest to each other when the lens barrel 19 is in the stored position, which reduces the thickness of the digital camera 18 in the optical axis direction.

Also according to the present embodiment, the inner circumferential portion of the diaphragm blades 6 is located inwardly in the radial direction with respect to the second lens holding frame 7 and oppositely in the radial direction with respect to the convex spherical portion of the second lens 2 when the lens barrel 19 is in the stored position, thereby reducing the outside diameter (C) of the iris diaphragm 5, which reduces, when the lens barrel 19 is in the stored position, the thickness of the image pickup apparatus in its optical axis direction and also the diameter of the lens barrel 19. This reduces the diameter of the lens barrel 19 and also reduces the vertical and horizontal dimensions to realize miniaturization of the digital camera 18.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-068619, filed Mar. 24, 2010, which is hereby incorporated by reference herein in its entirety.

What is claimed is:

1. A lens barrel having a first lens, a second lens, a lens holding unit adapted to hold the second lens in such a manner that the second lens moves relatively closer to or apart from the first lens in an optical axis direction of the lens barrel, and a diaphragm arranged between the first lens and the second lens and having an inner circumferential portion defining an opening changing in size to adjust an amount of incident light, the lens barrel moving between a photographing position and a stored position in the optical axis direction to change the photographing magnification, wherein a first lens side-surface of the second lens is shaped in a convex form, protruding toward the first lens, and the second lens is arranged close to the first lens and the inner circumferential portion of the diaphragm, the opening of which is changed in size to a full aperture, is arranged inwardly in the radial direction with respect to the lens holding unit and oppositely to the first lens side-surface of the second lens in the radial direction, when the lens barrel is in the stored position.

2. The lens barrel according to claim 1, wherein the diaphragm is arranged in such a manner that the diaphragm can move relatively closer to or apart from the first lens in the optical axis direction, and the diaphragm is arranged close to the first lens when the lens barrel is in the stored position.

3. The lens barrel according to claim 1, wherein the second lens is arranged on an image face side of the first lens.

4. An image pickup apparatus comprising:

the lens barrel recited in claim 1; and a zoom mechanism adapted to zoom-drive the lens barrel between the photographing position and the stored position in the optical axis direction.

* * * * *